United States Patent [19]

Rohland

[11] 4,131,377
[45] Dec. 26, 1978

[54] CABLE JOINT AND METHOD OF MAKING SAME

[75] Inventor: Gerhard Rohland, Ruvigliana-Lugano, Switzerland

[73] Assignee: Gerro Gerhard Rohland AB, Vastra Frolunda, Sweden

[21] Appl. No.: 849,596

[22] Filed: Nov. 8, 1977

[30] Foreign Application Priority Data

Nov. 9, 1976 [CH] Switzerland .................... 014110/76

[51] Int. Cl.² ........................................... F16G 11/02
[52] U.S. Cl. .................... 403/14; 403/212; 29/407
[58] Field of Search .................... 403/212, 210, 6, 10, 403/284, 13, 14, 11; 29/517, 518, 407

[56] References Cited

U.S. PATENT DOCUMENTS

| 2,587,095 | 2/1952 | Bergan | 403/284 |
| 2,999,703 | 9/1961 | Myers | 403/284 |
| 3,416,197 | 12/1968 | Mark | 403/284 X |

FOREIGN PATENT DOCUMENTS 1128333  9/1968  United Kingdom .................... 403/212

*Primary Examiner*—Andrew V. Kundrat
*Attorney, Agent, or Firm*—Jacobi, Lilling & Siegel

[57] ABSTRACT

A cable joint comprising a clamping sleeve adapted to be compressed over a looped cable end section. An opening is provided in the clamping sleeve for the inspection of the cable end within the sleeve. An insert of a material that is harder than the clamping sleeve is positioned in the opening prior to the compression of the sleeve and is retained therein during the compression of the sleeve to control the flow of the sleeve material around the opening.

8 Claims, 8 Drawing Figures

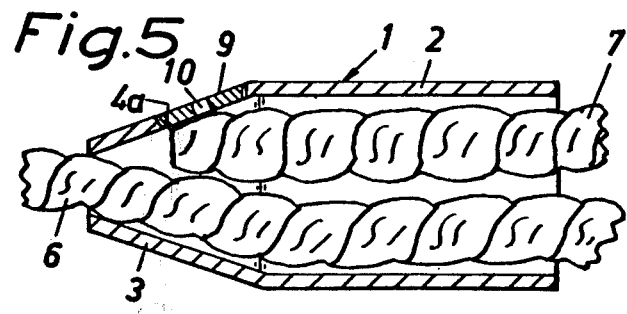
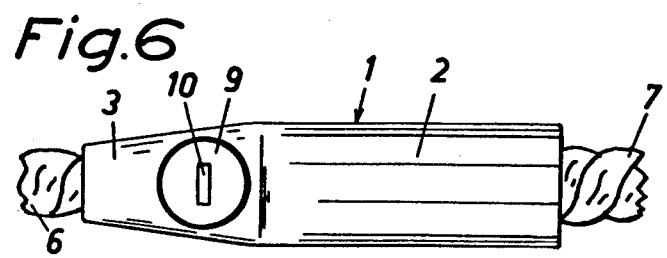
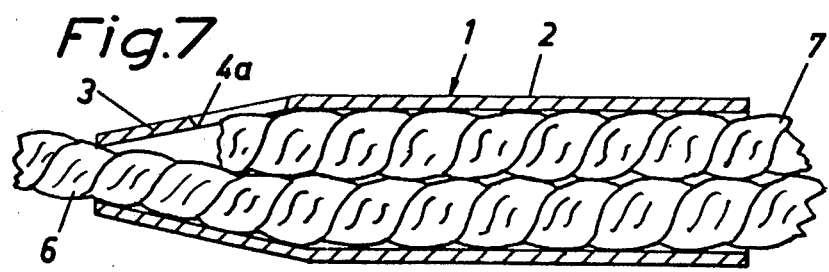
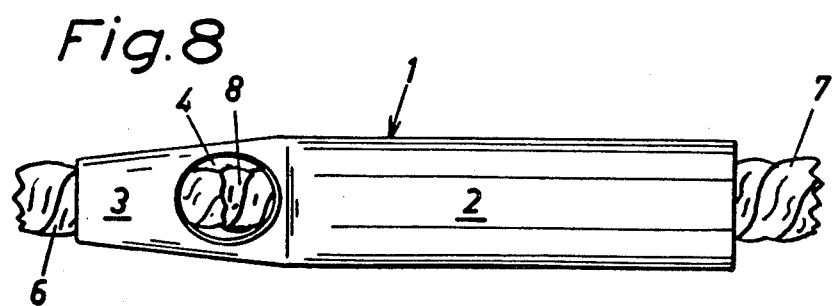

CABLE JOINT AND METHOD OF MAKING SAME

BACKGROUND OF THE INVENTION

The present invention concerns a method of arranging an inspection hole in cable joints of the kind comprising a clamping sleeve of essentially circular or oval cross-sectional shape and consisting of metal, a metal alloy, or a synthetic material, the clamping sleeve being provided with a preformed conical end portion or with a cylindrical end portion arranged to be shaped into conical configuration, the clamping sleeve being arranged, when compressed, to lock a cable end section which has been passed through the sleeve and positioned in a loop, with the cable end passed back into the sleeve, the clamping sleeve being provided with an opening in the end portion or the transitional zone intermediate the cylindrical sleeve portion and the conical end portion before compressing of the clamping sleeve.

It is previously known to provide clamping sleeves of this kind with a notch or opening whereby it becomes possible to check that the cable end is inserted sufficiently far into the sleeve. Prior art methods do not, however, function satisfactorily. In accordance with one prior art structure, the inspection hole is comparatively small, and as a result the position of the cable end inside the sleeve may be checked only before the clamping sleeve is compressed. During the compression of the sleeve, the opening often closes and, as a result, the final position of the cable end inside the clamping sleeve cannot be established with certainty.

In another prior art structure, the clamping sleeve is provided with a comparatively large indentation or notch which does not close completely during the compression of the clamping sleeve, and this structure therefore makes it possible to check the cable end position in the clamping sleeve after compression of the latter. However, during the compression of the sleeve, which is made from a plastic material, uncontrollable flow of material occurs in the sleeve, particularly in the marginal areas of the notch, and such flow may easily cause fissures, which extend in the longitudinal direction of the sleeve, and consequently the strength thereof is considerably reduced.

SUMMARY OF THE INVENTION

The purpose of the present invention is to provide cable joints of this kind with an inspection hole which makes checking of the cable end position inside the sleeve possible before as well as after the compression of the sleeve.

The method in accordance with the present invention is characterized by positioning an insert, which is made from a harder material than that forming the clamping sleeve, in the opening prior to the compression of the clamping sleeve, and retaining the insert therein at least until after completion of the compression operation.

The invention likewise comprises a device arranged to provide cable joints with an inspection hole. The device in accordance with the present invention is characterized by an insert which is made from a material that is harder than the material of the clamping sleeve and is placed in the opening during the compression of the clamping sleeve for the purpose of preventing uncontrollable flow of material.

BRIEF DESCRIPTION OF THE DRAWINGS

The invention will be described in closer detail in the following description with reference to some embodiments thereof illustrated in the attached drawings, wherein:

FIG. 5 is a side elevational view in section of a somewhat modified cable joint sleeve including the cable loop prior to the compression of the sleeve.

FIG. 6 is a plan view of the sleeve shown in FIG. 5;

FIG. 7 is a view similar to FIG. 5 showing the sleeve after compression; and

FIG. 8 is a plan view of the sleeve shown in FIG. 7.

DESCRIPTION OF THE PREFERRED EMBODIMENTS

Figure 1:
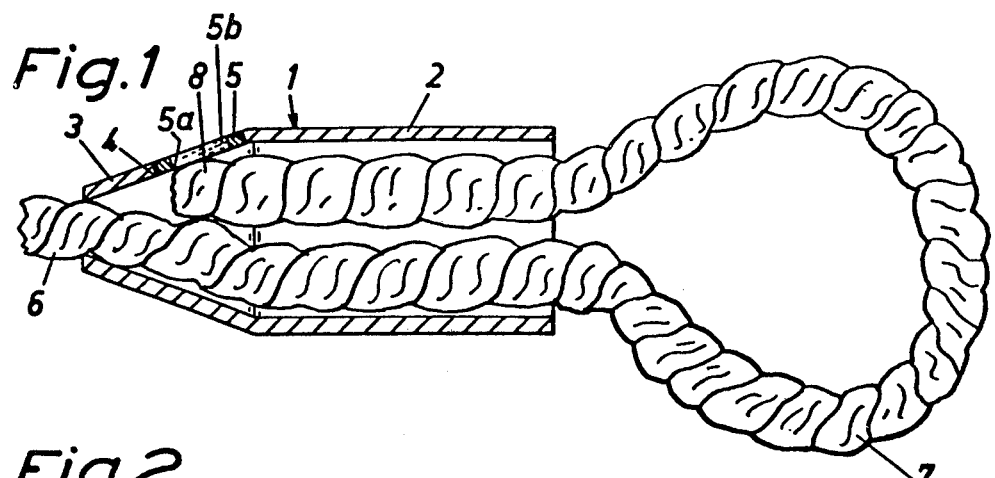
FIG. 1 is a side elevational view in section through a cable joint sleeve and the cable loop prior to the compression of the sleeve.
Figure 2:
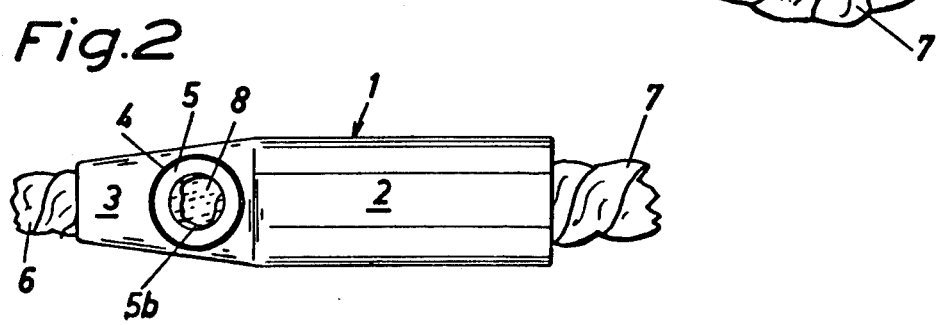
FIG. 2 is a plan view of the sleeve and loop shown in FIG. 1.

The cable joint sleeve 1 in accordance with FIG. 1 comprises a cylindrical portion 2 and a conical portion 3. In the conical portion, immediately adjacent the cylindrical portion or in the transitional area between the end portion and the cylindrical portion, an opening 4 is formed.

A ring 5 is inserted into the opening 4, the ring being made from a material which is harder than the material of the sleeve, e.g. from steel. To apply a cable, generally designated by numeral 6, the cable is initially inserted through the sleeve 1 from the conical end and passed therethrough so as to form a loop 7, whereafter the cable end 8 is carried back into the sleeve. As appears from FIG. 1, the cable end 8 is inserted sufficiently far to abut against an edge 5a on the ring. This edge 5a thus forms a stop means ensuring that the cable end 8 is inserted sufficiently far into the sleeve.

The cable 6 is then secured in a manner known per se by compression of the sleeve 1 about the cable ends therein, whereby a cable joint is formed. Owing to the provision of the ring 5, the plastic and moldable material making up the sleeve will flow in a controlled manner about the ring upon compression of the sleeve. The ring 5 inserted into the aperture 4 thus ensures that the inspection hole has the same size before and after the compression of the sleeve. The ring 5 also makes it possible to limit the width of the inspection hole to the smallest dimensions necessary, and consequently the sleeve will not be weakened to any appreciable degree.

Figure 3:
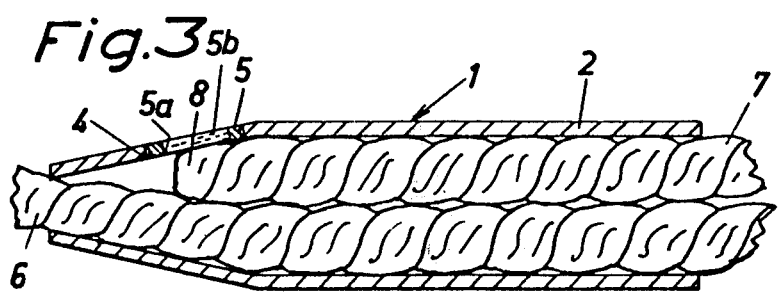
FIG. 3 is a view similar to FIG. 1 showing the sleeve after compression.
Figure 4:
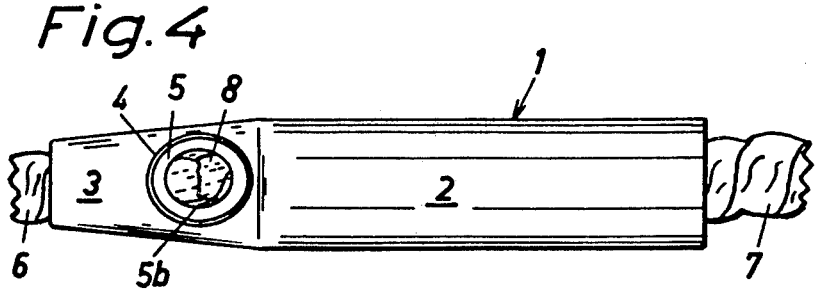
FIG. 4 is a plan view of the sleeve shown in FIG. 3.

After compression, the sleeve will take on the shape illustrated in FIG. 3. As a result of the material flow the cylindrical portion 2 as well as the conical portion 3 will be prolonged axially. At the same time, the cable end 8 will withdraw slightly away from the edge 5a on the ring. However, the cable end 8 will remain clearly visible through the ring, also after the compression of the sleeve.

Through the hole of the ring 5 dirt and moisture may penetrate, and for this reason it is preferable to provide a disk 5b of a transparent material to cover the hole, this disk forming a window. The disk 5b may be made from e.g. plexiglass.

In the embodiment of the invention illustrated in FIGS. 5–8, details identical with those used in the embodiment in accordance with FIGS. 1-4 have been given the same numeral references.

The ring has been replaced by a disk 9 having a centrally located hole 10. The cable 6 is secured in the same manner as described with reference to the embodiment according to FIGS. 1-4, the difference being that the disk 9 is applied in the hole 4 only after the cable end 8 has been placed in position. The cable end 8 is pushed inwards until it abuts against an edge 4a of the hole.

Like edge 5a of the ring in accordance with the embodiment described above, the edge 4a forms a stop means ensuring that the cable end 8 has been inserted sufficiently far into the sleeve. This may also be checked through the hole 4 before the disk 9 is applied in position. The disk 9, like the ring 5, is made from a harder material than the material of the sleeve 1, and in this way uncontrollable material flow about the hole 4 during the compression of the sleeve is prevented. When the compression of the sleeve is completed, the disk 9 is removed from the hole so as to permit the position of the cable end 8 to be checked. The hole 4 as well as the disk 9 have a conical shape to facilitate removal of the disk 9. The disk 9 may be removed in a simple manner with the aid of some tool, such as a screwdriver.

The invention is not limited to the embodiments as described above but several modifications thereof are possible within the scope of the appended claims. For instance, the insert may be in the form of a projecting pin provided on a tool to compress the sleeve about the cable parts, this kind of insert thus being positioned in the hole during the compression moment proper and thereafter automatically removed, when the tool is moved apart.

In addition, a disk of a transparent material which is harder than that making up the cable joint, may be used to form the inspection hole means proper.

What is claimed is:

1. In a cable joint having an inspection hole, the cable joint being of the kind comprising a clamping sleeve of deformable material, the clamping sleeve being provided with an end portion and being arranged, when compressed, to lock a cable end section which has been passed through the sleeve and positioned in a loop, with the cable end passed back into the sleeve, the clamping sleeve being further provided with an opening therethrough intermediate the ends thereof which is located adjacent the cable end so that it is visible through the opening, the improvement comprising an insert made from a material that is harder than the material of the clamping sleeve and is placed in said opening during the compression of the clamping sleeve for the purpose of preventing uncontrollable material flow and insuring that the cable end is visible through said opening in the compressed sleeve.

2. A cable joint as claimed in claim 1, characterized in that the insert is a removably arranged disk.

3. A cable joint as claimed in claim 1, characterized in that the insert is a pin projecting on a tool intended to compress the clamping sleeve.

4. A cable joint as claimed in claim 2, characterized in that the insert tapers conically inwards of the sleeve and in that the walls of the opening are correspondingly conically shaped.

5. A cable joint as claimed in claim 1, characterized in that the insert is a ring which is securely attached in the opening, the hole in said ring serving as an inspection hole.

6. A cable joint as claimed in claim 5, characterized in that in the hole in the ring is positioned a disk of a transparent material.

7. A cable joint as claimed in claim 1, characterized in that the insert is a transparent disk.

8. In a method of arranging an inspection hole in cable joints of the kind comprising a clamping sleeve of deformable material, the clamping sleeve being provided with an end portion and being arranged, when compressed, to lock a cable end section which has been passed through the sleeve and positioned in a loop, with the cable end passed back into the sleeve, the clamping sleeve being further provided with an opening therethrough intermediate the ends thereof which is located adjacent the cable end so that it is visible through the opening, the improvement comprising the steps of positioning an insert, made from a material harder than that forming the clamping sleeve, in the opening prior to the compression of the clamping sleeve, and retaining said insert in said opening at least until after completion of the compression operation to insure that the cable end is visible through said opening in the compressed sleeve.

* * * * *